United States Patent [19]

Ames

[11] 4,456,741
[45] Jun. 26, 1984

[54] TERPOLYMER COMPOSITIONS USEFUL AS PRESSURE-SENSITIVE ADHESIVES

[75] Inventor: William A. Ames, Longview, Tex.
[73] Assignee: Eastman Kodak Company, Rochester, N.Y.
[21] Appl. No.: 458,493
[22] Filed: Jan. 17, 1983
[51] Int. Cl.$^3$ ............................................. C08F 212/08
[52] U.S. Cl. ..................................... 526/264; 428/355
[58] Field of Search .......................................... 526/264

[56] References Cited

U.S. PATENT DOCUMENTS

| | | | |
|---|---|---|---|
| 3,142,664 | 7/1964 | Bauer | 526/264 |
| 3,690,937 | 9/1972 | Guse et al. | 526/264 |
| 4,086,410 | 4/1978 | Song | 526/264 |
| 4,164,614 | 8/1979 | Ames | 526/264 |

Primary Examiner—Harry Wong, Jr.
Attorney, Agent, or Firm—Clyde L. Tootle; Daniel B. Reece, III

[57] ABSTRACT

The invention relates to hot-melt pressure-sensitive adhesive compositions having a novel combination of properties. More specifically, the invention relates to polymerized terpolymer compositions containing n-butyl acrylate, N-vinyl-2-pyrrolidinone and styrene which provide pressure-sensitive adhesives. These terpolymer hot-melt pressure-sensitive adhesive compositions have good peel adhesion, excellent shear adhesion and permanent tack.

8 Claims, No Drawings

TERPOLYMER COMPOSITIONS USEFUL AS PRESSURE-SENSITIVE ADHESIVES

This invention relates to hot-melt pressure-sensitive adhesive compositions having a novel combination of properties. More specifically, the invention relates to polymerized terpolymer compositions containing n-butyl acrylate, N-vinyl-2-pyrrolidinone and styrene which provide pressure-sensitive adhesive compositions having a novel combination of properties.

Pressure-sensitive (PSA) products have experienced a rapid growth rate in recent years because of their ease of application. Typical pressure-sensitive adhesive applications include, for example, tapes (consumer, industrial, and surgical), labels, decals, films, floor tile and wall and shelf coverings. Until recently, virtually all hot-melt pressure-sensitive compositions were based on blends of thermoplastic elastomers and plasticizers with tackifiers. Frequently fillers such as zinc oxide or magnesium oxide are used in PSA formulations which are applied to opaque backing substrates. Typical backing materials include paper, cellophane, plasticized poly(vinyl chloride), polyester film, cellulose acetate film, cloth, foamed polymers (e.g., foamed polystyrene or polypropylene), metal foils, felt, cork and the like.

Acrylic hot-melt, pressure-sensitive adhesives normally exhibit excellent peel and tack properties, but are deficient in shear adhesion or creep resistance. They are also transparent, have excellent resistance to ultraviolet light and weathering, and exhibit permanent tack. Acrylic adhesives may be modified to yield acrylic products with improved shear adhesion. For example, acrylic polymers can be prepared which contain three monomers such, for example, as the terpolymer compositions containing 2-ethylhexyl acrylate, N-vinyl-2-pyrrolidinone and styrene disclosed in U.S. Pat. No. 4,164,614. While the physical adhesive properties of the terpolymers are substantially improved over the two component acrylic compounds, the adhesive properties of the terpolymer are not completely satisfactory for some applications, such for example, as where the adhesive shear adhesion value must be greater than about five hours. Therefore, it would be an advance in the state of the art to provide an acrylic hot-melt pressure-sensitive adhesive having a good balance of adhesive properties including a shear adhesion value greater than about five hours.

In accordance with the present invention it has been found that a terpolymer composition containing n-butyl acrylate, N-vinyl-2-pyrrolidinone and styrene provides a hot-melt pressure-sensitive adhesive having a novel adhesive composition and a unique combination of properties. The terpolymer composition contains from 80 to 60 weight percent n-butyl acrylate, preferably 70 weight percent, from 25 to 15 weight percent N-vinyl-2-pyrrolidinone, preferably 20 weight percent, and about 15 to 5 weight percent styrene, preferably 10 weight percent.

When the amount of n-butyl acrylate is greater than 80 percent the shear adhesion strength is too low to be used as a commercially acceptable adhesive. Below 60 percent the adhesive has very low tack and peel strength. When the amount of N-vinyl-2-pyrrolidinone is greater than 25% the peel strength is low and the cost of the adhesive increases as the N-vinyl-2-pyrrolidinone is the most expensive component, and if less than 15 percent, the adhesive shear strength is too low. If the amount of styrene is greater than 15 percent the tack is lower and the adhesive "zippers" during the peel test. "Zippering" describes a condition wherein the adhesive alternately and in rapid succession cycles from maximum to zero peel strength as the adhesive tape is removed from the substrate by peel forces. This results in some adhesive transfer and is undesirable. At less than 5 percent styrene, the 180° peel strength is low.

The terpolymers of the present invention have a melt viscosity of from 15,000 to 200,000, preferably 30,000 to 100,000. Viscosities greater than 200,000 are too viscous for use. At viscosities less than 15,000 shear adhesion is reduced and residue may be transferred to the substrate on which the label is attached. The melt viscosities were determined at 177° C. in a Thermosel viscometer.

The terpolymers can be applied to tapes or labels by conventional means such as doctor blades, extrusion coating equipment, and the like.

The terpolymers are prepared by polymerizing the monomers in a conventional solution polymerization using a free radical polymerization catalyst, such as azobisisobutyronitrile.

Suitable reaction vessels include those made from glass or metal. For example, the reactions may be conducted in glass flasks, glass lined reactors, steel autoclaves, and the like. The reactions may be conducted in the presence of an inert gas such as nitrogen. Although not required, it is desirable to carry out the reaction in the presence of an inert solvent such as hexane or benzene and the like.

The pressure-sensitive adhesives of this invention may be stabilized by the addition of conventional stabilizers for polyolefin materials such as dilauryl thiodipropionate, Plastanox 1212 (lauryl stearyl thiodipropionate), Irganox 1010 [pentaerythritol tetrakis[3-(3,5-di-tert-butyl-4-hydroxyphenyl)propionate]]. Eastman Inhibitor DOPC (dioctadecyl p-cresol), Plastanox 2246 [2,2'-methylene bis(4-methyl-6-tert-butylphenol)], and Ethyl 702 [4,4'-methylene bis(2,6-di-tert-butylphenol)], or combinations of such stabilizers. Effective stabilizer concentrations may range from about 0.1 to about 0.5% by weight. For example, 0.25% Irganox 1010 or a combination of 0.25% Irganox 1010 with 0.25% Plastanox 1212 provides good melt viscosity and color stability when the adhesive is maintained in molten form at 177° C. for 8 hours or longer.

The adhesives of the invention may be used alone or in mixture with other materials such as polyterpenes such as those commercially available and sold as "Nirez 1100", "Nirez 1135", "Piccolyte S10", "Piccolyte 40", "Piccolyte 100", or "Piccolyte 135"; hydrocarbon resins such as "Piccopale 65", "Piccopale 100", "Staybelite", or DAC-B hydrocarbon resin.

The following procedures were used to determine the physical and adhesive properties of the compositions of the present invention.

Melt viscosities were determined in a Thermosel viscometer at 177° C.

The adhesives were coated molten onto 1 mil Mylar film. The film strips were 1 inch wide and approximately 14 inches long. Molten adhesive was poured onto the film strip. The strip was drawn under a heated doctor blade to deposit adhesive 1±0.2 mils in thickness. The tapes were aged 24 hours in a dust-free environment before testing.

The 180° peel adhesion values of the adhesive coated tapes were determined using Pressure Sensitive Tape Council Procedure PSTC-1. The values are reported in pounds per inch. The amount of residue transferred to the test panel after the peel test was conducted was determined and is reported as percent residue.

Shear adhesion values of the adhesive coated tapes were determined using Pressure Sensitive Tape Council Test PSTC-7 with a 1 kg. weight. The time taken for the coated tape to completely separate from the test panel is reported as the shear adhesion value.

Probe tack values for the coated tapes were determined on a Polyken Probe Tack Test Unit. The values are reported in grams and are the average of 5 determinations.

Glass transition temperatures were determined on a Perkin Elmer DSC-2 Differential Scanning Calorimeter.

This invention can be further illustrated by the following examples although it will be understood that these examples are included merely for purposes of illustration and are not intended to limit the scope of the invention.

EXAMPLE 1

VAZO 64 (azobisisobutyronitrile) (0.50 g.) was dissolved in a mixture consisting of 140 g. of 2-ethylhexyl acrylate, 40 g. of N-vinyl-2-pyrrolidinone, and 20 g. of styrene. This solution and 200 ml of hexane were charged to a 1-l. flask fitted with stirrer, condenser, thermowell, and $N_2$ bubbler. The reagents were heated to 50° C. under $N_2$ with stirring. After 20 hours, an additional 0.25 g. of VAZO 64 was added. The temperature was increased to 60°–70° C. 24 hours later after polymerization had occurred and held for an additional 5 hours. Product was recovered by vacuum stripping.

The adhesive was transparent with a slight yellow cast. It had the following properties.

| Melt Viscosity at 177° C. | = 75,000 cp |
| --- | --- |
| Shear Adhesion | = 3.2 hours |
| 180° Peel Adhesion | = 2.86 lbs./in. |
| Residue | = None |
| Probe Tack | = 690 g. |
| Tg | = −24° C. |

This example shows that the adhesive composition has a desirable combination of adhesion properties with the exception that shear adhesion is low for some applications.

This example shows the most pertinent prior art as disclosed in U.S. Pat. No. 4,164,614.

EXAMPLE 2

A mixture of 140 g. of n-butyl acrylate, 40 g. of N-vinyl-2-pyrrolidone, 20 g. of styrene and 0.2 g. benzoyl peroxide was added dropwise over two hours to 100 ml refluxing toluene in a 1-liter four neck round bottom flask equipped with a mantel, a mechanical stirrer, reflux condenser, gas inlet tube and thermowell after the system was purged with nitrogen. Polymerization was continued for four hours and an additional 0.15 g. benzoyl peroxide added and polymerization continued an additional eight hours. The system was then cooled and the terpolymer recovered by stripping. The yield was quantitative. The terpolymer contained 70 weight percent n-butyl acrylate, 20 weight percent N-vinyl-2-pyrrolidinone and 10 weight percent styrene. A part of the terpolymer was coated onto Mylar tape and the adhesion properties and percent residue determined. The following properties were determined:

| Melt Viscosity at 177° C. | = 67,500 cp. |
| --- | --- |
| Shear Adhesion | = 22.9 hours |
| 180° Peel Adhesion | = 2.85 lbs./in. |
| Residue | = None |
| Probe Tack | = 675 g. |
| Tg, °C. | = −24 |

This example shows that the adhesives have about the same viscosity as the adhesive of the terpolymer of Example I but the shear adhesion values are dramatically increased.

This example shows that all of the adhesive properties of this composition are similar to those of the prior art composition shown in Example 1 except for shear adhesion. The shear adhesion value for the adhesive of the present invention is seven times greater than that of the prior art composition at similar melt viscosities. This is an unobvious and unexpected dramatic improvement in shear adhesion.

EXAMPLE 3

The procedure of Example 2 was repeated except 150 ml. of toluene was used rather than 100 ml. and the initial benzoyl peroxide charge was reduced from 0.20 to 0.15 g. These changes gave a product having a melt viscosity at 177° C. of 24,400 cp. The following adhesive properties were determined:

| Shear Adhesion | = 12.4 hours |
| --- | --- |
| 180° Peel Adhesion | = 2.5 lbs./in |
| Residue | = None |
| Probe Tack | = 480 g. |

This example shows that even at 24,400 cp. this adhesive has a shear adhesion value almost 4 times that of the prior art composition of Example 1 having a viscosity of 75,000 cp.

EXAMPLE 4

The procedure of Example 2 was repeated using 140 g. of butyl acrylate and 60 g. of styrene. A total of 100 ml. of toluene and a single initial charge of 0.20 g. of benzoyl peroxide was used. The adhesive had the following properties.

| Melt Viscosity at 177° C. | = 22,250 cp. |
| --- | --- |
| Shear Adhesion | = 10.1 hours |
| 180° Peel Adhesion | = 2.5 lbs./in. |
| Residue | = Slight |
| Probe Tack | = 180 g. |

This is a two-component adhesive containing only polymerized butyl acrylate and styrene. Compared to the results shown in Example 3, since these two products are at similar viscosities, it is apparent that the three-component adhesive composition of this invention is preferred. It has slightly higher shear adhesion and the same 180° peel adhesion. Unlike the two-component adhesive, it does not transfer residue in the 180° peel adhesion test. The three-component adhesive of the present invention of Example 3 also has almost three times the probe tack value of the two-component product of this example. Therefore, the three-component adhesive has greater sticking power or tackiness.

EXAMPLE 5

A pressure-sensitive hot-melt adhesive was prepared following the procedure of Example 2 using 140 g. of butyl acrylate and 60 g. of N-vinyl-2-pyrrolidinone with 100 ml. toluene as solvent and 0.20 g. benzoyl peroxide initiator. The following properties were determined:

| | |
|---|---|
| Melt Viscosity at 177° C. | = 12,750 cp. |
| Shear Adhesion | = 10.1 hours |
| 180° Peel Adhesion | = 3.0 lbs./in. |
| Residue | = None |
| Probe Tack | = 474 g. |

This is also a two-component adhesive and has properties better than those of the two-component adhesive of Example 4. The composition compares favorably in properties to the three-component adhesives at similar viscosities of the present invention, but is too expensive to produce because of the greater amount of the more expensive monomer, N-vinyl-2-pyrrolidinone, required to make it.

EXAMPLE 6

Benzoyl peroxide (0.25 g.) was dissolved in a mixture of 140 g. butyl acrylate, 40 g. N-vinyl-2-pyrrolidinone, and 20 g. of styrene. About 50 ml. of this solution was charged to a 1-liter flask fitted with stirrer, dropping funnel, condenser, and thermowell containing 200-ml. of toluene. The solution was heated to reflux with stirring under a nitrogen atmosphere. The remaining monomer-initiator mixture was added dropwise over 3 hours.

An additional 0.20 g. of benzoyl peroxide dissolved in about 10 ml. of toluene was added and the polymerization allowed to continue for 9 more hours. The product was isolated by vacuum stripping. It had the following properties.

| | |
|---|---|
| Melt Viscosity at 177° C. | = 7,500 cp. |
| Shear Adhesion | = 6.8 hours |
| 180° Peel Adhesion | = 2.75 lbs./in. |
| Residue | = <5% |
| Probe Tack | = 945 g. |

The fact that adhesive transfers slight residue during the 180° peel adhesion test shows that a higher viscosity product is needed if the adhesive coated tape is to be used in removable applications. However, even at this very low viscosity, this composition has a shear adhesion value slightly greater than twice that of the prior art composition of Example 1.

The terpolymer adhesives of this invention are useful as pressure-sensitive adhesives. As pressure-sensitive adhesives they find utility in preparing tapes by applying the adhesive by conventional hot-melt procedures to a substrate such as a film which can be prepared from conventional film materials such as a polyester, for example. The pressure-sensitive adhesive can also be applied onto labels, decals, floor tile as well as wall coverings such as wallpaper, and shelf coverings, such as shelf paper.

Although the invention has been described in considerable detail with particular reference to preferred embodiments thereof, variations and modifications can be effected within the spirit and scope of the invention.

I claim:

1. A polymerized terpolymeric composition comprising about 80 to 60 weight percent n-butyl acrylate, about 25 to 15 weight percent N-vinyl-2-pyrrolidinone, and about 15 to 5 weight percent styrene and having a melt viscosity of about 15,000 to 200,000 which is useful as a pressure-sensitive adhesive.

2. A terpolymer composition according to claim 1 wherein said n-butyl acrylate is present in an amount of about 70 weight percent.

3. A terpolymer composition according to claim 2 wherein said N-vinyl-2-pyrrolidinone is present in an amount of about 20 weight percent.

4. A terpolymer composition according to claim 3 wherein said styrene is present in an amount of about 10 weight percent.

5. A terpolymeric composition according to claim 1 having a viscosity of from 30,000 to 100,000.

6. A terpolymer composition according to claim 5 wherein said n-butyl acrylate is present in an amount of about 70 weight percent.

7. A terpolymer composition according to claim 6 wherein said N-vinyl-2-pyrrolidinone is present in an amount of about 20 weight percent.

8. A terpolymer composition according to claim 7 wherein said styrene is present in an amount of about 10 weight percent.

* * * * *